Oct. 12, 1971  P. W. ZWEEGERS  3,611,690
AGRICULTURAL IMPLEMENT SUCH AS A HAYMAKER
Filed June 2, 1970  6 Sheets-Sheet 1
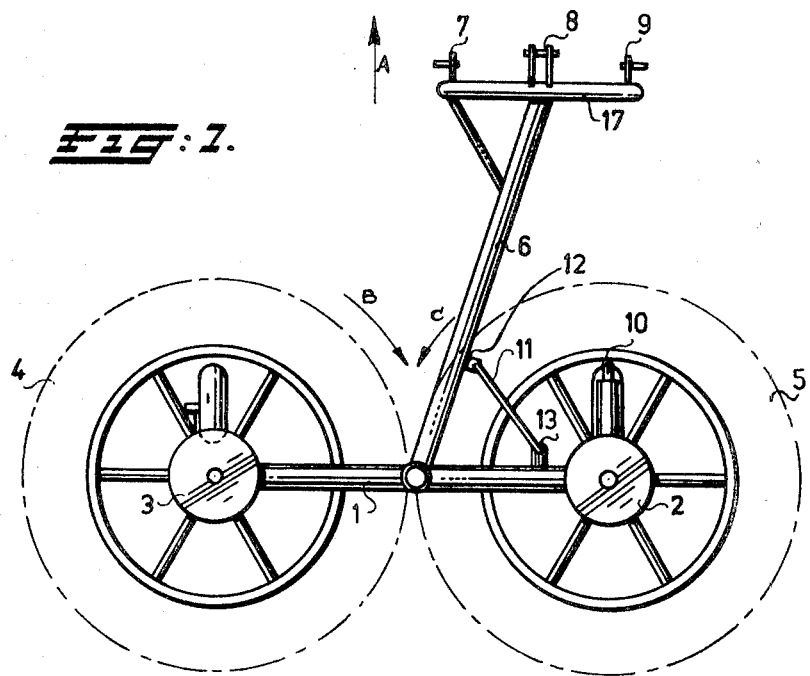
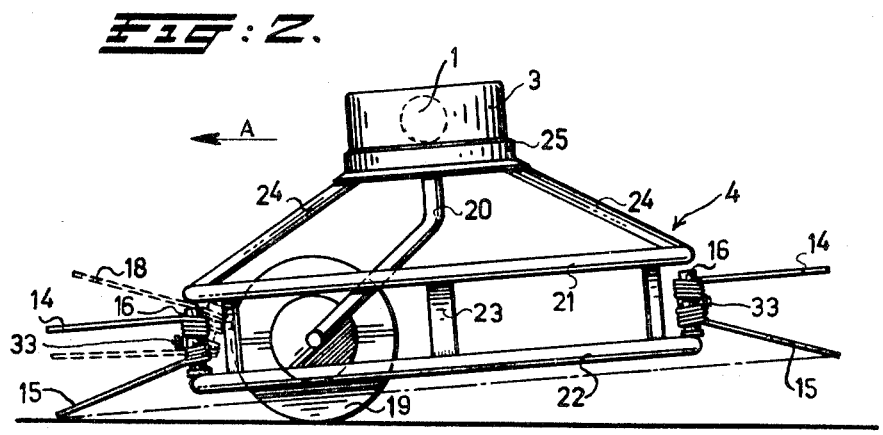

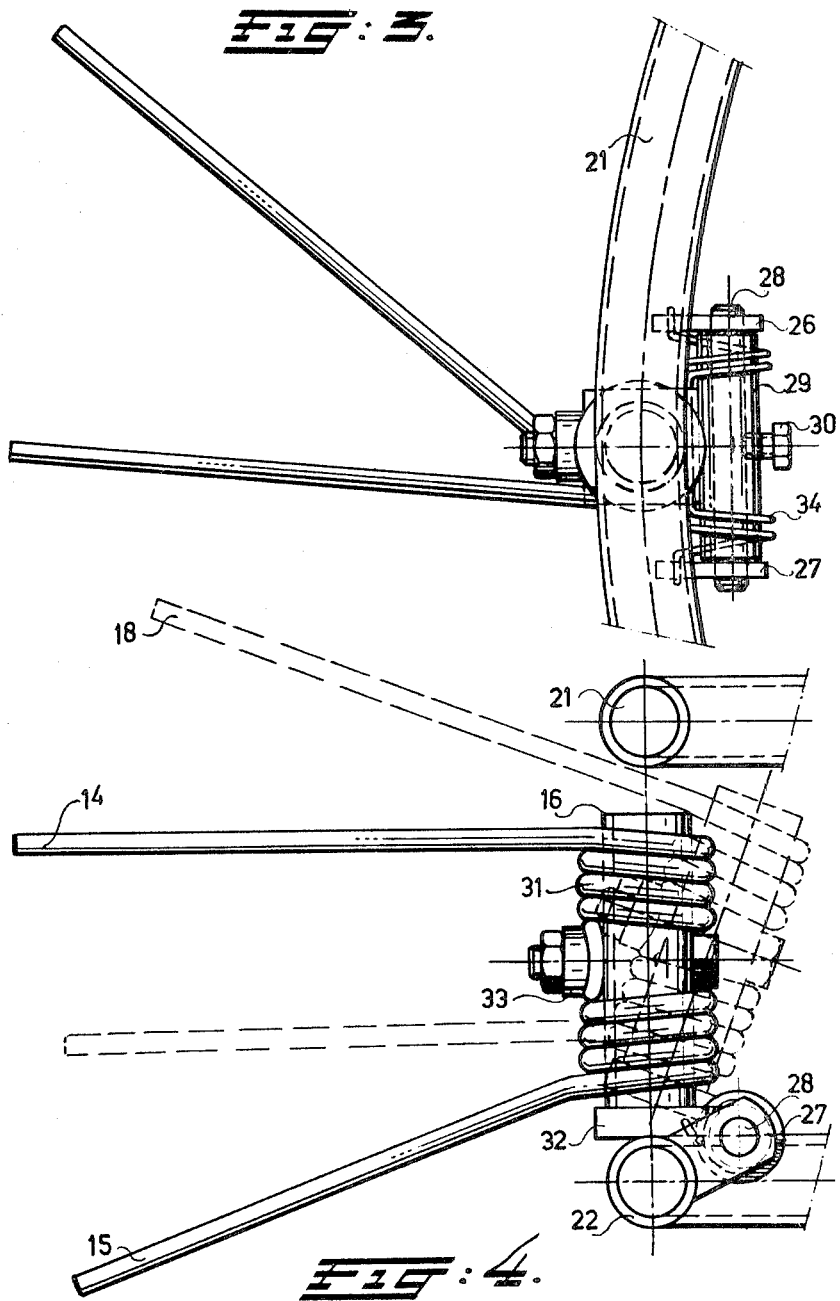

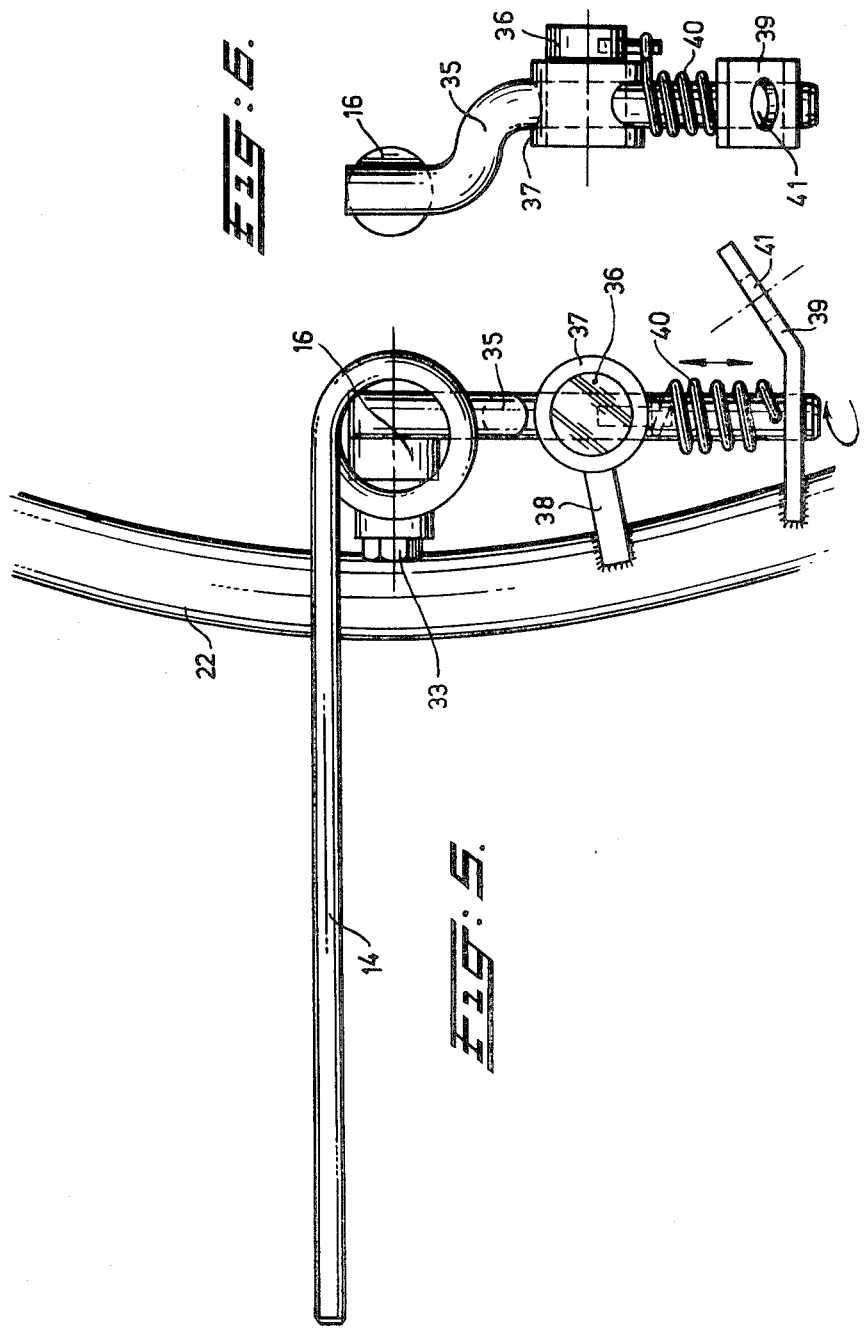

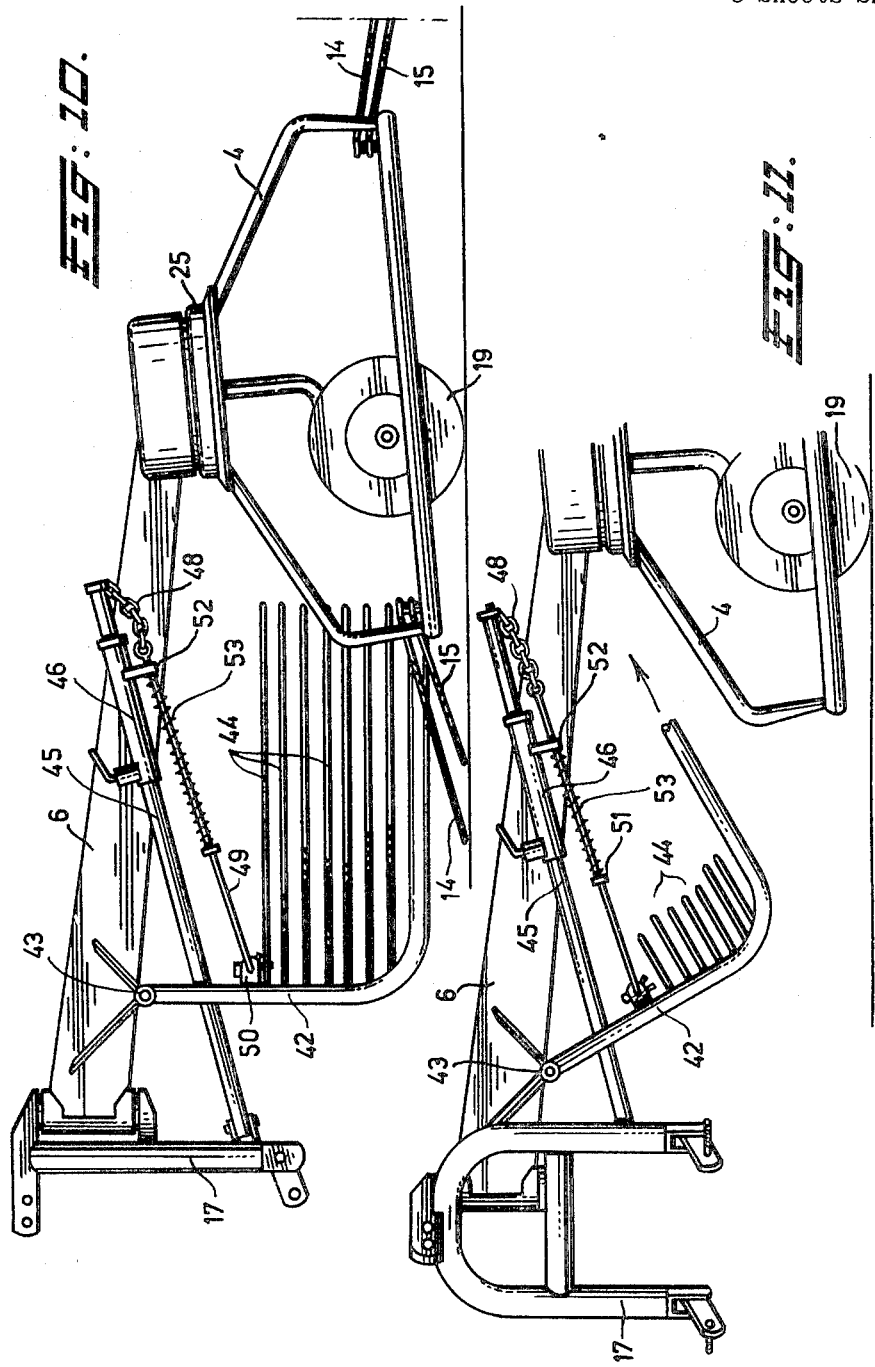

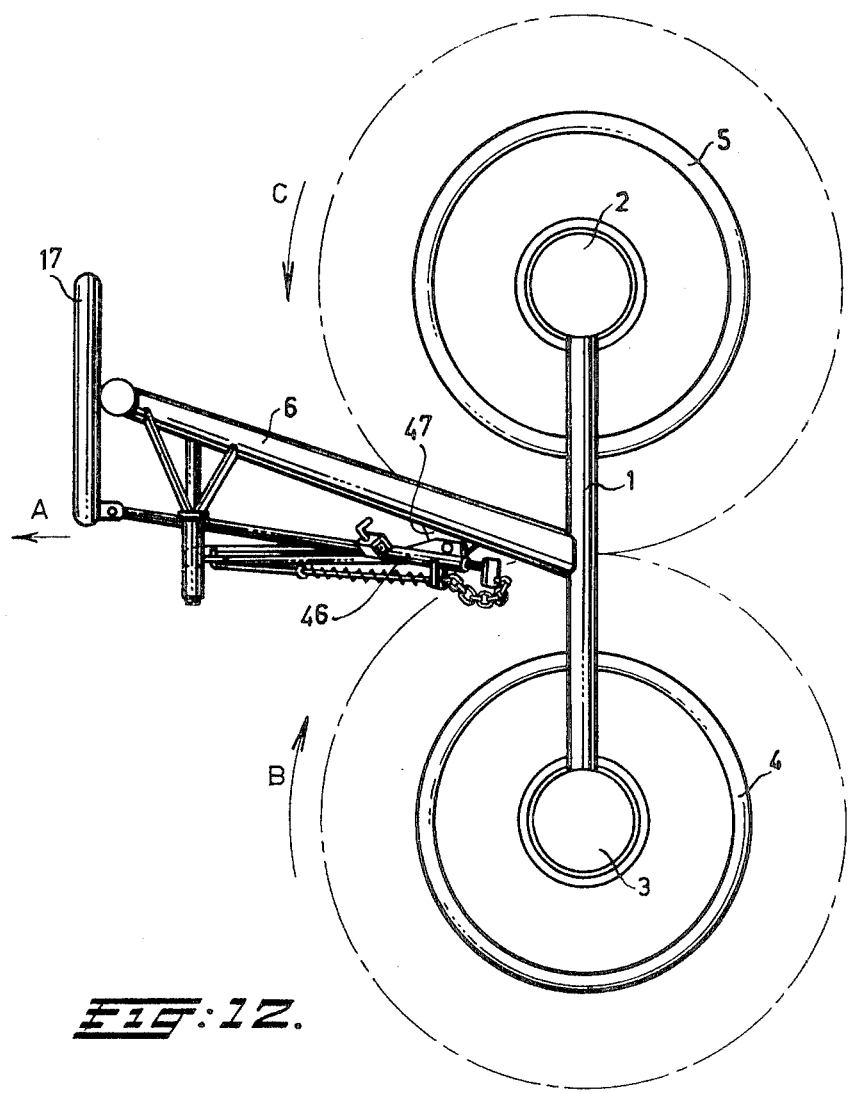

3,611,690
AGRICULTURAL IMPLEMENT SUCH AS A
HAYMAKER
Petrus Wilhelmus Zweegers, Nieuwendijk 46,
Geldrop, Netherlands
Filed June 2, 1970, Ser. No. 42,774
Claims priority, application Netherlands, June 5, 1969,
6908537; July 11, 1969, 6910757
Int. Cl. A01d 81/00
U.S. Cl. 56—366                          15 Claims

ABSTRACT OF THE DISCLOSURE

The invention relates to an agricultural implement such as a haymaker, with one or more tine carrying wheels which rotate in a forwardly inclined plane. The tines are pivotally connected to the wheels and are held outwards by centrifugal force when the wheel rotates. But when the wheel is stopped, the tines pivot upwardly under the action of a spring.

The tines may be adjustable and their operative position may be limited by stops.

In an implement with two adjacent tine carrying wheels, a crop separation board or rack may be mounted between and forwardly of the wheels.

BACKGROUND OF THE INVENTION

This invention relates to an agricultural implement such as a haymaker, having at least one rotary element carrying a circular array of crop working means such as tines and being rotatable in a plane which is substantially parallel to the ground and which is preferably forwardly inclined to a sharp angle with the ground. In this specification, the rotary element is called a wheel for shortness' sake, but it should be understood that the rotary element comprises any element capable of carrying a circular array of crop working means such as tines and capable of being rotated in a substantially horizontal plane. Also, for shortness' sake, the crop working means are simply termed tines in this specification, but they may have different shapes. The tines are pivotally connected with the rotary element, such that when the element rotates, the centrifugal force holds the tines in an outwardly extending position.

In a known implement of this type, the tines pivot about substantially vertical axes, so that they will yield rearwardly when they hit the crop or an obstacle during rotation of the rotary element. Thus, the tines adapt themselves to working conditions during operation of the implement, but when the implement is driven or towed forwardly while the rotary elements are not rotating, such as during road transport, the danger exists that the protruding tines, especially at the downwardly inclined front side of the rotary elements, dig into the ground or hook under an obstacle.

BRIEF SUMMARY OF THE INVENTION

According to the invention, the just mentioned disadvantage is obviated by providing that the tines pivot about axes which extend substantially in tangential direction of the wheel and the tines are biased by springs in a direction to pivot the tines upwardly in substantially axial planes of the wheel when the wheel is not rotating.

Thus, the tines are pivoted to an upwardly extending position as soon as the wheel stops, so that there is no danger that they dig into the ground or hit obstacles, whereas as soon as the wheel is set in rotary motion, the centrifugal force pivots the tines downwardly to their operating position, against the force of the springs. During operation, there is no danger that the tines got stuck, because they move in a circular path and moreover they can yield upwardly against the centrifugal force when hitting an obstacle or the ground. Further, the tines are usually made of spring steel wire and thus are resilient.

The invention provides further that when the wheel is stopped, the motion of the upwardly pivoting tines is such that from their operating position they have immediately an inwardly directed component of movement, so that the tines are immediately inwardly retracted from their operating position and thus are further protected. This is obtained according to the invention in that the tines are mounted on supporting arms which in their operating position extend upwardly from their pivoting connection with the wheel and in their inoperative position extend inwardly from said pivot point. Thus, although just as in conventional machines, the tines may be inclined downwardly with respect to a radial plane of the wheel in operative position, the arrangement can be such that the tips of the tines are not or substantially not lower than their pivot points so that they do not have an outward component of motion when pivoting upwardly.

Further, when the tines are carried by a rim of the wheel, the pivot axes of the tines are preferably disposed inwardly of said rim so that the rim protects the pivot connection against damage and accumulation of dirt or crop particles.

According to a further feature of the invention, the extreme operating position of the tines is limited by stops, e.g. in that the tines or their supporting arms engage the rim of the wheel. The stop position may be adjustable by changing the position of the tines with respect to the rim, e.g. by mounting the tines or their supporting arms on pivot pins which are not only rotatable about their own axes but can also be adjusted about an axis substantial parallel to the wheel axis, so that the pivot pin can be angularly adjusted with respect to the wheel axis to make the tine engage with another area of the rim. Especially when the adjusting axis of the pivot pin extends in an axial plane of the wheel which is angularly offset with respect to the axial plane in which the tines extend, the adjustment of the tines causes the tines not only to be rocked but also to be inwardly or outwardly displaced with respect to the rim of the wheel, so that the adjustment produces a substantial change in the stop position of the tines with respect to the rim.

The biasing springs of the tines may comprise torsion springs wound about the pivot pin of the tines. When the pivot pins are angularly or adjustable for changing the stop position of the tines, said torsion springs can also serve to lock the angular position of the pivot pin, e.g. by holding said pivot pin engaged in one of a number of holes of a part of the rim, the pivot pin in this case being e.g. slidably mounted so as to be retractable from said hole against the action of the spring.

If the implement comprises two adjacent, oppositely rotating, tine carrying wheels, the invention further provides means for ensuring a proper working of the crop by the tines at the front side of the wheels. For in this case the danger exists that the tines of one wheel throw the crop into the tines of the adjacent wheel, so that wads of the crop cling to the tines, the implement tends to clog and the crop is not properly worked. According to the invention, this can be obviated in that a crop separation means is mounted substantially in the median plane perpendicular to the connection line of the wheel centers and in front of said line.

The crop separation means may comprise a board, rack or the like suspended from the frame of the implement so as to slide over the ground with its lower edge. The implement may be provided with a linkage to lift the crop separation means when the implement moves through a curve. The crop separating means keeps the crop worked by the two wheels mutually separated and moreover, the lower edge of the separation means will slide over piles of crop on the ground, so that the tines will not throw such a pile as one mass to the rear of the implement, but the tines may gradually pick the crop out of the pile held under the lower edge of the crop separation means.

SUMMARY OF THE DRAWINGS

The invention will now be further ellucidated with reference to the accompanying drawings.

FIG. 1 is a plan view of a haymaking implement according to the invention.

FIG. 2 is a side view of the implement of FIG. 1.

FIG. 3 is a plan view of a tine connection in the implement according to FIGS. 1 and 2.

FIG. 4 is a side view of the tine connection of FIG. 3.

FIG. 5 is a plan view of a modified tine connection.

FIG. 6 is a side view to FIG. 5.

FIG. 10 is a side view of an embodiment comprising a crop separation means.

FIG. 11 is a corresponding side view in the position in which the implement is moving through a curve.

FIG. 12 is a plan view of the implement according to FIGS. 10 and 11.

DETAILED DESCRIPTION

Figure 7:
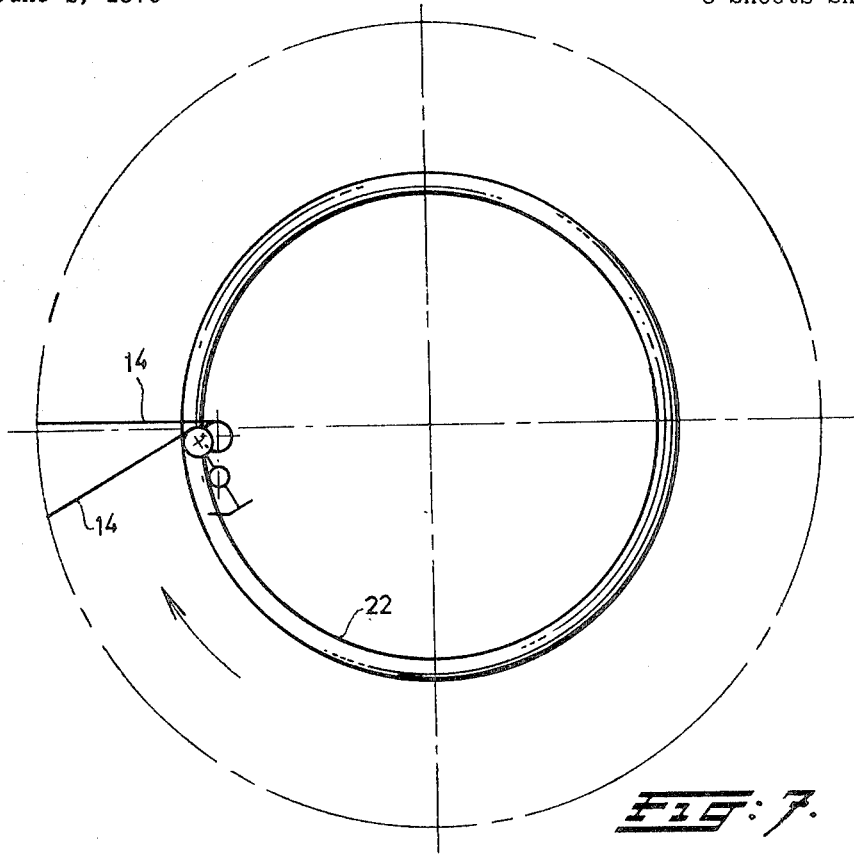
FIG. 7 is a schematic plan view of a wheel of the implement, in which two different positions of angular adjustment of the tines are shown.

The embodiment of the haymaking implement as shown in FIGS. 1 and 2 has a main frame beam 1 extending transversely to the direction of movement of the implement. The main frame beam 1 has at both ends a gear case 2, 3 from which a wheel 4, 5 is rotatably suspended. In the center of the main frame beam 1, a draw bar 6 is pivotably connected and the draw bar 6 is held in a fixed position with respect to the beam 1 by a link 11 hooked into a lug of the draw bar 6 and into a lug 13 of the beam 1. The front end of the draw bar 6 is fastened to a subframe 17 which has three coupling means 7, 8 and 9 for coupling the implement to a not shown tractor. A drive shaft 10 extends from the front of the gear case 3 and can be connected to the power take-off shaft of the tractor via a not shown coupling shaft. The gear cases 2 and 3 are mutually coupled by a shaft mounted inside the main frame beam 1, such that the wheels 4 and 5 are driven in mutually directions indicated by arrows B and C.

In operation, the impleemnt is somewhat forwardly inclined in the direction of movement A, as shown in FIG. 2, so that crop disposed on the ground can be worked at the front of the wheels 4 and 5. The crop is worked by resilient tines 14 and 15 mounted on supporting arms 16 fastened to the wheels 4 and 5. When the wheels 4 and 5 do not rotate, the supporting arms 16 with the tines 14 and 15 pivot toward an inoperative position shown by chain lines 18.

Ground wheels 19 are mounted under and inside the wheels 4 and 5 at the lower end of a supporting rod 20 which extends downwardly and forwardly from the gear case 2 or 3 respectively, so as to support the tine carrying wheel as closely as possible to its front side. Each tine carrying wheel 4 or 5 respectively comprises two coaxial tubular ring shaped supporting rims 21 and 22 fastened together at a predetermined vertical spacing by transverse connections 23. Via a spider 24, the upper tubular rim 21 is fastened to a hub 25 which is rotatably connected with the gear case 2 or 3 respectively.

As shown in FIGS. 3 and 4, the resilient tines 14 and 15 are formed by the two outwardly directed extremities of a spring steel wire which is fixed in its central area by a bolt 33 to the substantially vertically extending supporting arms 16 and which is, from said center area, coiled in mutually opposite directions and ends in the tines 14 and 15. The lower end of the supporting arm 16 is welded to a block 21, which is welded itself to a bushing 29, the latter being rotatably mounted on a pivot pin 28 extending substantially in tangential direction of the ring shaped rim 22. The ends of the pivot pin are supported in two lugs 26 and 27 welded to the inner side of the ring shaped rim 22. The lugs 26 and 27 extend inwardly and upwardly from the rim 22 and the block 32 extends outwardly from the bushing 29 so that it is located over the rim 22. A torsion spring 34 has a straight central area which extends under the block 32 and two oppositely coiled ends which are disposed about the bushing 29 and end in hooks which are hooked under the lips 26 and 27. Thus, the torsion spring 34 tends to pivot the supporting arm 16 upwardly and inwardly so that in a stationary situation, the tines 14 and 15 are upwardly directed and are held in the inoperative position shown by chain lines 18. By changing the construction of the wheel, e.g. by using a smaller upper rim 21, the inoperative position of the tines 14 and 15 may be further inward than shown in the drawing.

The force exerted by the torsion spring 34 on the supporting arm 16 is so chosen with respect to the rotational speed of the wheels 4 and 5 that when the wheel rotates, the centrifugal force pivots the supporting arm 16 with the tines 14 and 15 outwardly against the action of the spring. The extreme operating position is limited by engagement of the block 32 with the upper edge of the rim 22. It is not always necessary that during normal free rotation of the wheel the block 32 engages the rim 22, it may be even be advantageous to have some clearance between the block 32 and the rim 22 in the normal operative position, so that the tines 14 and 15 may rock somewhat during operation and the rim 22 only serves to limit the rocking movement to an extreme position by engagement of the block 32 and the rim 22. When the drive to the wheels 4 and 5 is disconnected and the rotational speed of the wheels 4 and 5 decreases, the centrifugal force will at a certain speed be overcome by the force of the springs 34, so that the tines 14 and 15 will pivot upwardly to their inoperative position. A special advantage of the present construction is that during operation the pressure of the tines on the ground is very light, because during operation, the springs 34 almost balance the centrifugal force on the tines so that the tines can easily yield upwardly when meeting uneven areas of the ground, obstacles etc.

In the embodiment according to FIGS. 5 and 6, the supporting arm 16 for the tines 14 and 15 is fastened to one end of a crank shaped pivot pin 35, the central area of which is slidably and rotatably accommodated in a cylindrical block 36 which is itself rotatably held in a bushing 37 fastened to the rim 22 via a connecting piece 38. The rotational axis of the cylindrical block 36 is at right angles to the rotational axis of the pin 35 and is substantially parallel to the axis of the wheel 4 or 5. The bushing 37 has elongated slots at diametrally opposed sides and the pin 35 extends through said slots so that it is angularly adjustable about the axis of the block 36. The end of the pin 35 remote from the end carrying the arm 16, is held in a hole of a strip 39 welded to the rim 22. A torsional spring 40 is coiled about the pin 35 and one end thereof is fixed to the pin and the other end thereof is fixed to the block 37 such that the pin 35 is resiliently loaded in longitudinal direction to hold it in the hole of the strip 39 and is also resiliently loaded in circumferential direction to pivot the supporting arms 16 with the tines 14 and 15 upwardly when the rotation of the wheel is stopped. The pin 35 extends substantially in tangential direction of the wheel 4 or 5, so that the operation is similar to the embodiment of FIGS. 1 and 2, but moreover, the pin 35 can be angularly adjusted about the axis of the bushing 37 by moving it longitudinally against the force of the spring 40 so as to retract the pin from the hole of the strip 39, after which the pin 35 can be rocked in the bushing 37 and subsequently will be engaged in another hole 41 of the strip 39 by the force of the spring 40. If desired, the strip 39 can have more than two alined holes so as to provide several positions of adjustment for the pin 35.

Figure 8:
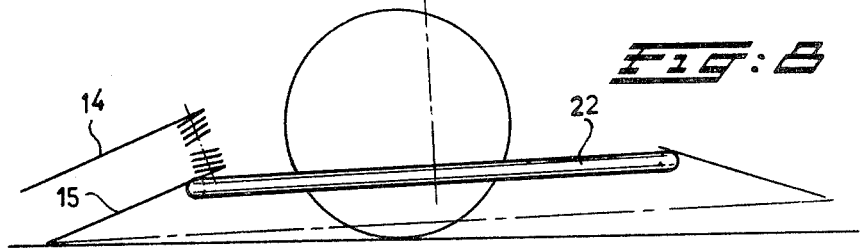
FIG. 8 is a side view to FIG. 7, in a first position of angular adjustment.
Figure 9:
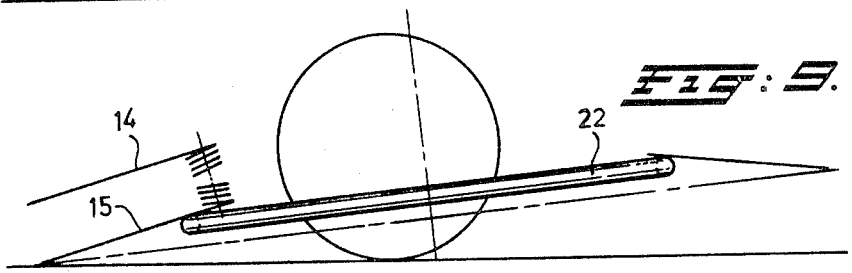
FIG. 9 is a side view to FIG. 7, in a second position of angular adjustment.

When the pin 35 is rocked with respect to the bushing 37, the tines 15 will engage the rim 22 at a modified angle, see FIGS. 7 to 9. The position shown in FIG. 5 corresponds to the upper position of FIG. 7 and to the position of FIG. 9, whilst the lower position of FIG. 7, corresponding to the position of FIG. 8, is obtained when the pin 35 is transferred to the other hole 41 in FIG. 5. As shown in FIGS. 8 and 9, the inclination of the axial plane of the wheel 4 or 5 itself with respect to the ground is changed for the different operations to be carried out by the implement such as raking, tedding or spreading, e.g. by means of an adjustable connection between the supporting rod 20 of the ground wheel 19 (see FIG. 2) and the gear case 2 or 3. When the inclination of the tine carrying wheel is changed, the inclination of the tines 14 and 15 with respect to the wheel should also be changed and this is done transfering the pin 35 to another hole of the strip 39, as described with reference to FIG. 5. When transfering the pin 35 from the position shown in FIG. 5 to the other position corresponding to the hole 41, the supporting arm 16 is moved outwardly with respect to the rim 22, and this causes the tines 15 to engage the rim 22 at a steeper inclination, which can be seen by comparing the positions of FIGS. 8 and 9.

In the embodiment of FIG. 5, the tine connection is positioned inside the rim 2, just as in the previous embodiment, so that the tine connection is protected against damage and against accumulation of dirt and crop particles. Just as in the previous embodiment, the supporting arm 16 of the embodiment of FIG. 5 extends upwardly from the pin 35, so that when stopping the wheels 4 and 5, the upwardly pivoting tines have immediately an inwardly directed component of motion to obtain a fast retraction of the tines. The extreme operating position of the tines 14 and 15 is limited by engagement of the tines 15 with the rim 22, which engagement may be adjusted as just described.

In the embodiment according to FIGS. 10 to 12, the draw bar 6 of the implement carries a crop separation means 42, which is disposed in front of and centrally between the two wheels 4 and 5, that is substantially in the median plane perpendicular to the connecting line of the wheel centers. Apart from the separation means, this embodiment corresponds essentially to the embodiment according to FIGS. 1 and 2, with the exception that the main frame beam 1 is permanently fastened to the draw bar 6 and the draw bar 6 is fastened to the subframe 17 by a pivot connection.

A laterally protruding pivot pin 43, from which the crop separation means 42 is pivotably suspended, is fastened to the left side of the draw bar 6, at the front part thereof. The crop separation means 42 comprises a tube which is downwardly directed from the pivot 43 and is subsequently bent rearwardly, and a row of parallel rearwardly directed pins 44, the front ends of which are welded to the downwardly directed part of the tube 42 and the free rear ends of which are alternately bent to the right and to the left. Instead of the rack as shown, the corp separation means may also comprise a board or plate. However, the bent ends of the pins 42 are favorable for guiding the crop. During operation, the two wheels 4 and 5 engage the crop at their front sides and feed it towards the center and the crop separation means 42 serves to keep apart the two masses of crop at both sides thereof. Moreover, the crop separation means 42 slides over the crop which is disposed on the ground and holds it temporarily, so that the tines 14 and 15 of the wheels 4 and 5 gradually lossen the crop from under the lower edge of the crop separation means. Thus, said means prevents that a pile of crop is thrown rearwardly as a compact mass. The rear ends of the pins 44 extend as far as possible between the wheels 4 and 5 to obtain the best possible guidance.

The front end of a rearwardly and upwardly directed rod 45 is pivotably mounted to the left side of the subframe 17, and the rear end of said rod is slidably guided in a sleeve 46, which is pivotably mounted on a lug 47 welded to the left side of the rear part of the draw bar 6. The rear end of the rod 45 protrudes from behind the sleeve 46 and is connected to a chain 48, the other end of which is connected to the rear end of a rod 49, which is connected at its forward end to a lug 50 welded to the vertical part of the tube 42 of the crop separation means. A coil spring 53 is provided between an abutment 51 of the rod 49 and an abutment 52 on the sleeve 46 so as to keep the crop separation means 42, 44 in its normal operating position on or at a small spacing above the ground. But when the tractor makes a left turn, the subframe 17 pivots to the left and the rod 45 is pushed rearwardly so that the chain 48 pulls the rod 49 rearwardly and the crop separation means 42, 44 is lifted as shown in FIG. 11. This prevents that during movement of the implement through a curve, the crop separation means 42, 44 would make a lateral sliding motion over the ground and push the crop to one side.

In principle, it would be possible to provide a lifting device for the crop separation means 42, 44 to lift said means both in right and in left curves. But in the implement shown, the draw bar 6 has an inclined position with respect to the main frame beam 1 so that the implement extends for the greater part at the left side of the tractor. Accordingly the operator will exclusively make left turns during operation and the device as shown, which lifts the crop separation means 43, 44 only in left turns, is sufficient.

Within the scope of the invention, several variants are possible. It is e.g. possible to provide means such as guiding surfaces for the tines which promote during operation that the rotating tines are freed, that is, move upwardly, when they meet a resistance.

What I claim is:

1. An agricultural implement, such as a haymaker, comprising at least one rotary element carrying a circular array of crop working means such as tines and being rotatable in a plane which is substantially parallel to the ground and is preferably forwardly inclined at a sharp angle to the ground, the tines being pivotably connected to the e.g. wheel shaped rotary element such that when said element rotates, the tines are held outwardly by the centrifugal force, wherein the tines pivot about axes which extend substantially in tangential direction of the rotary element and are provided with springs which pivot the tines upwardly in substantially axial planes of the rotary element when the rotation of said element is stopped.

2. Agricultural implement according to claim 1, wherein the tines are fastened to supporting arms which in operation extend upwardly from their pivot connection with the rotary element and which swing inwardly when the rotation of the element is stopped.

3. Agricultural implement according to claim 1, wherein the biasing springs of the tines comprise torsion springs wound about the pivot pins of the tines.

4. Agricultural element according to claim 1, in which the tines are mounted to a circular rim of the rotary element wherein the pivot pins of the tines are mounted within the area surrounded by the circular rim.

5. Agricultural implement according to claim 1, wherein the extreme operating position of the tines is defined by stops.

6. Agricultural implement according to claim 5, wherein the extreme position of the tines is defined by engagement of the tines or their supporting arms with the circular rim of the rotary element.

7. Agricultural implement according to claim 6, wherein the engagement is adjustable by changing the position of the tines with respect to the circular rim.

8. Agricultural implement according to claim 7, wherein the pivot pins of the tines are not only rotatable about their own axis, but also about an axis which is substantially parallel to the axis of the rotary element.

9. Agricultural implement according to claim 8, wherein the angular adjustment axis of the pivot pin is circumferentially offset with respect to the axial plane of the rotary element comprising the tines carried by said pivot pin.

10. Agricultural implement according to claim 3, wherein the pivot pin is longitudinally slidable in a block which is connected to the rotary element so as to pivot about an axis which is substantially perpendicular to the pivot pin, the rotary element also carrying a strip with at least two alined holes in which one end of the pivot pin can engage, the torsion spring for biasing the pivot pin in circumferential direction also biasing said pin in longitudinal direction so as to keep it in one of the holes of the strip.

11. Agricultural implement, such as a haymaker, comprising two adjacent counter-rotatable elements each carrying a circular array of crop engaging means such as tines, said element being rotatable in a plane which is substantially parallel to the ground and is preferably forwardly inclined, wherein a crop separation means is mounted forwardly and centrally of the two rotary elements substantially in the median plane perpendicular to the connection line of the centers of the two rotary elements.

12. Agricultural implement according to claim 11, wherein the front end of the crop separation means is connected with the frame of the implement by a pivot pin so as to be towed over the crop during straight movement of the implement, lifting means being provided to lift the crop separating means from the crop when the implement moves through a curve.

13. Agricultural implement according to claim 12, wherein the crop separation means comprises a rod or tube which extends from the pivot pin initially in downward direction and then curves rearwardly, a plurality of rearwardly directed pins being fastened with their front end to the downwardly directed part of the rod or tube in regularly spaced positions, the rear ends of the parallel pins being alternately bent to the right and to the left.

14. Agricultural implement according to claim 12, wherein the pivot pin is mounted to one side of a draw bar of the frame of the implement, the draw bar being pivotably connected to a subframe which can be mounted to a tractor, an intermediate point of the downwardly directed part of the tube or rod being so connected with a lateral part of the subframe that when the subframe pivots with respect to the draw bar, the crop separation means is upwardly pivoted.

15. Agricultural implement according to claim 14, wherein the connection between the subframe and the crop separation means comprises a slidably guided rod which extends rearwardly from the subframe and a connection of the rear end of said rod with said intermediate point of the crop separation means.

References Cited

UNITED STATES PATENTS 2,577,264   5/1951   Oppegaard _____ 56—366

FOREIGN PATENTS 579,309   7/1959   Canada.
261,282   4/1968   Austria.

ANTONIO F. GUIDA, Primary Examiner